United States Patent
Yamagiwa et al.

(10) Patent No.: US 6,720,280 B2
(45) Date of Patent: Apr. 13, 2004

(54) DIELECTRIC COMPOSITION FOR HIGH FREQUENCY RESONATORS

(75) Inventors: Katsuya Yamagiwa, Aichi (JP); Jun Otsuka, Aichi (JP); Takashi Kasashima, Aichi (JP); Manabu Sato, Aichi (JP); Kazuhisa Itakura, Aichi (JP); Takashi Oba, Aichi (JP); Masahiko Matsumiya, Aichi (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 10/170,413

(22) Filed: Jun. 14, 2002

(65) Prior Publication Data

US 2003/0176273 A1 Sep. 18, 2003

(30) Foreign Application Priority Data

Jun. 20, 2001 (JP) ......................................... 2001-187008

(51) Int. Cl.[7] ............................................. C04B 35/495
(52) U.S. Cl. ...................................... 501/134; 501/135
(58) Field of Search ................................... 501/134, 135

(56) References Cited

U.S. PATENT DOCUMENTS 4,585,744 A    4/1986    Konoike et al.

FOREIGN PATENT DOCUMENTS

| EP | 0 838 446 A1 | 4/1998 |
|---|---|---|
| JP | 60-124305 | 7/1985 |
| JP | 62-190607 | 8/1987 |
| JP | 2-60627 | 12/1990 |
| JP | 2-60628 | 12/1990 |
| JP | 6-260031 | 9/1994 |
| JP | 9-315863 | 12/1997 |
| JP | 11-273988 | 10/1999 |
| JP | 3006188 | 2/2000 |
| JP | 2001-26480 | 1/2001 |
| JP | 2001-106568 | 4/2001 |

*Primary Examiner*—Karl Group
(74) *Attorney, Agent, or Firm*—Larson & Taylor, PLC

(57) ABSTRACT

A dielectric composition is based on a BaO—MgO—$Nb_2O_5$ system material (BMN system material) having a dielectric constant, $\epsilon$, of about 30, a large Q-value (no-load quality coefficient) and a comparatively small absolute value of the temperature coefficient ($\tau_f$) of its resonance frequency but containing no expensive Ta. The dielectric material has a composite perovskite crystal structure as the main crystal phase, wherein a predetermined amount of $KNbO_3$ is added to a BMN system material. The high frequency characteristics can be further improved by partially replacing Nb with Sb and partially replacing the B site of the perovskite crystal structure with Sn.

12 Claims, No Drawings

DIELECTRIC COMPOSITION FOR HIGH FREQUENCY RESONATORS

FIELD OF THE INVENTION

This invention relates to a dielectric material suitable for use as a dielectric resonator. More particularly, the invention relates to a low loss dielectric material suitable for use as a high frequency dielectric resonator.

BACKGROUND OF THE INVENTION

Materials of the BaO—MgO—$Nb_2O_5$ system (referred to herein as the BMN system) are known as high frequency dielectric materials. Laid-Open Japanese Patent Application No. 60-124305 and Japanese Patent Publication No. 2-60628 describe materials of the BMN system suitable for high frequency use.

However, the BMN system materials exemplified in the above Japanese patent documents include Ta which is expensive. In order to reduce manufacturing costs, it would be desirable to provide a BMN system material containing no Ta but still having desirable high frequency characteristics.

SUMMARY OF THE INVENTION

The present invention has as an object thereof to provide a dielectric composition which is based on a BMN system material but which includes no Ta, and in which: (1) the dielectric constant $\epsilon$ is about 30, (2) the Q-value, i.e., the no-load quality coefficient, is large, and (3) the absolute value of $\tau_f$, the temperature coefficient of the resonant frequency, is comparatively small. As will be understood by those skilled in the art, the parameters Q (sometimes given as $Q_0$) and $\tau_f$ are important quantities in analyzing the characteristics of a dielectric material, with the latter being determined by measuring the change in resonant frequency with temperature.

In accordance with a first aspect of the present invention, there is provided a dielectric material having a composite perovskite crystal structure including K, Ba, Mg and Nb as metallic elements in a main crystal phase, and having a compositional formula represented by:

$$(1-x)Ba_\alpha(Mg_\beta Nb_{1-\beta})O_3-xK_pNbO_3.$$

wherein x, $\alpha$, $\beta$ and p have values satisfying the conditions

0<x≦0.1, 0.9≦α≦1.3, 0.3≦β≦0.35 and 1≦p≦2.

In accordance with a second aspect of the present invention, there is provided a dielectric material having a composite perovskite crystal structure including K, Mg, Sb, Ba and Nb as metallic elements in the main crystal phase, and having a compositional formula represented by:

$$(1-x)Ba_\alpha(Mg_\beta Nb_\gamma Sb_\delta)O_3-xK_pNbO_3,$$

wherein x, $\alpha$, $\beta$, $\gamma$, $\delta$ and p have values satisfying the conditions 0<x≦0.1, 0.9≦α≦1.3, 0.3≦β≦0.35, 0<δ≦0.125, β+γ+δ=1 and 1≦p≦2.

In accordance with a third aspect of the present invention, there is provided a dielectric material having of a composite perovskite crystal structure including Sn, K, Mg, Sb, Ba and Nb as metallic elements in a main crystal phase, and having a compositional formula represented by:

$$(1-x)\{(1-y)Ba_\alpha(Mg_\beta Nb_\gamma Sb_\delta)O_3-yBaSnO_3\}-xK_pNbO_3$$

wherein x, y, $\alpha$, $\beta$, $\gamma$, $\delta$ and p have values satisfying the conditions 0<x≦0.1, 0<y≦0.5, 0.9≦α≦1.3, 0.3≦β≦0.35, 0<δ≦0.125, δ+γ+δ=1 and 1≦p≦2.

Further features and advantages of the present invention will be set forth in, or apparent from, the detailed description of preferred embodiments thereof which follows.

DETAILED DESCRIPTION OF THE PREFERRED EMBODIMENTS

In the compositional formulas set forth above, the oxygen ratios will naturally depend upon the variables $\alpha$, $\beta$, $\gamma$, $\delta$, and p. Accordingly, none of the dielectric compositions of the present invention should be considered as being limited only to an oxygen mole ratio of 3. This is because the most important aspect of the dielectric compositions of the present invention is not whether the mole ratio of oxygen is 3, but, instead, whether the mole ratio of each different metal is prescribed within a certain range. Accordingly, in the dielectric compositions of the present invention, it should be noted that the mole ratio of oxygen is given as 3 for the convenience of avoiding unnecessary complexity in the compositional formulas.

The dielectric compositions of the present invention are characterized in that sintering can be improved without any deterioration of the high frequency characteristics, by adding $K_pNbO_3$ to a specific BMN system material and optionally incorporating a predetermined amount of another specified metal in a specific ratio.

When no $K_pNbO_3$ is added, the specific BMN (BaO—MgO—$Nb_2O_5$) system material cannot be sintered. Further, when the amount, x, of $K_pNbO_3$ is greater than 0.1, the Q-value (the no-load quality coefficient) is reduced. Thus, the sintering and dielectric characteristics can be reconciled by prescribing the ratio of $K_pNbO_3$ to BMN (BaO—MgO—N $b_2O_5$) material as x.

When the coefficient p of $K_pNbO_3$ is smaller than 1, it is difficult to sinter the specific BMN system material. When the coefficient p of $K_pNbO_3$ is greater than 2, the Q-value is reduced.

A higher Q-value can be obtained by prescribing the quantity of Ba occupying Ba sites within the composite perovskite compound, to a predetermined range. Specifically, the coefficient $\alpha$ of Ba is preferably set to be within the range from 0.9 to 1.3. When $\alpha$ is greater than 1.3, it is difficult to sinter the BMN system material. When $\alpha$ is smaller than 0.9, the Q-value is reduced. The coefficient $\alpha$ preferably ranges from 1.0 to 1.2, and, more preferably, ranges from 1.0 to 1.05. The temperature coefficient ($\tau_f$) of the resonance frequency can preferably also be set as well as the Q-value.

The coefficient $\beta$ of Mg preferably ranges from 0.3 to 0.35. When $\beta$ is greater than 0.35, it is difficult to sinter the BMN system material. When $\beta$ is smaller than 0.3, the Q-value is reduced. The coefficient $\beta$ more preferably ranges from 0.31 to 0.33. The temperature coefficient ($\tau_f$) of the resonant frequency can preferably also be set as well as the Q-value.

A higher Q-value can be obtained by using a material (referred to herein as a BMNSb material) in which an Nb site in the dielectric composition of the present invention is partially replaced with Sb. The coefficient $\delta$ of Sb is preferably set to be equal to or smaller than 0.125. When $\delta$ is greater than 0.125, sintering is more difficult and the reproducibility of the desirable characteristics is also reduced. The coefficient δ more preferably ranges from 0.05 to 0.075 since a high Q-value can then be obtained.

The temperature coefficient ($\tau_f$) of the resonance frequency (which can approach zero) can be further improved by partially replacing the B-site of the perovskite crystal structure with Sn in the BMNSb system material. The quantity y of Sn preferably ranges from 0.15 to 0.3 since the temperature coefficient $\tau_f$ can be adjusted to within ±10. An excellent value almost near 0 ppm/K in the temperature coefficient τf is obtained by setting the quantity y of Sn to be within the range of 0.22 to 0.23 (and, more preferably, at 0.225).

The following Examples illustrate the invention but should not be considered as limiting the scope thereof.

EXAMPLES

Manufacture of Dielectric Composition

The quantities of commercially available $BaCO_3$, MgO, $Nb_2O_5$, $Sb_2O_3$ and $K_2CO_3$ represented by the corresponding coefficients of x, y, α, β, γ, δ and p, as shown in the following Table 1, and ethanol as a solvent, are wet-blended. The blended powder, which is obtained by drying and removing the solvent, is then calcined for two hours at 1100° C. in air. Next, a wax system binder, a dispersion agent and ethanol are added to the calcined material, and are crushed and mixed by a ball mill so that a slurry is obtained. This slurry is dried and granulated, and the granulated powder is molded in a column 19 mm in diameter and 12 mm in thickness at a pressure of 10 to 20 MPa. This molded body is then processed by a CIP (cold hydrostatic press) at a pressure of 150 MPa. Finally, this CIP-processed molded body is heated for four hours at 1550 to 1650° C. in air to form a calcined body.

Evaluation of Dielectric Characteristics

The calcined body obtained as described above is formed into a column (14 mm in diameter and 7 mm in height) and surface finished with a surface grinder. The dielectric constant ε, the quantity Qf, which is the product of the Q-value and the resonance frequency f, and the temperature coefficient $\tau_f$ of the resonance frequency (wherein the measurement frequency is 4 to 6 GHz, and the temperature range is 25 to 80° C.) are measured using the known parallel conductor plate type dielectric resonator method. The results are set out in Table 2.

TABLE 1

| Sample No. | Composition | | | | | | |
|---|---|---|---|---|---|---|---|
| | x | y | α | β | γ | δ | P |
| 1 | 0.100 | 0.000 | 1.000 | 0.320 | 0.630 | 0.050 | 1.000 |
| 2 | 0.100 | 0.000 | 1.000 | 0.320 | 0.630 | 0.050 | 1.250 |
| 3 | 0.075 | 0.000 | 1.000 | 0.320 | 0.630 | 0.050 | 1.250 |
| 4 | 0.025 | 0.000 | 1.000 | 0.300 | 0.650 | 0.050 | 1.250 |
| 5 | 0.050 | 0.000 | 1.000 | 0.334 | 0.589 | 0.077 | 1.000 |
| 6 | 0.050 | 0.000 | 1.000 | 0.334 | 0.589 | 0.077 | 1.000 |
| 7 | 0.025 | 0.000 | 1.000 | 0.350 | 0.600 | 0.050 | 1.250 |
| 8 | 0.025 | 0.000 | 1.000 | 0.308 | 0.642 | 0.050 | 1.250 |
| 9 | 0.025 | 0.000 | 1.000 | 0.320 | 0.579 | 0.101 | 1.250 |
| 10 | 0.025 | 0.000 | 1.000 | 0.320 | 0.630 | 0.050 | 2.000 |
| 11 | 0.025 | 0.000 | 1.000 | 0.350 | 0.600 | 0.050 | 1.250 |
| 12 | 0.025 | 0.000 | 1.000 | 0.349 | 0.622 | 0.000 | 1.250 |
| 13 | 0.025 | 0.000 | 1.000 | 0.309 | 0.616 | 0.075 | 1.250 |

TABLE 1-continued

| Sample No. | Composition | | | | | | |
|---|---|---|---|---|---|---|---|
| | x | y | α | β | γ | δ | P |
| 14 | 0.025 | 0.000 | 1.000 | 0.320 | 0.670 | 0.010 | 1.250 |
| 15 | 0.025 | 0.000 | 1.000 | 0.349 | 0.592 | 0.059 | 1.250 |
| 16 | 0.050 | 0.000 | 1.000 | 0.320 | 0.630 | 0.050 | 1.250 |
| 17 | 0.025 | 0.000 | 1.300 | 0.320 | 0.630 | 0.050 | 1.250 |
| 18 | 0.025 | 0.000 | 1.000 | 0.320 | 0.555 | 0.125 | 1.250 |
| 19 | 0.025 | 0.000 | 1.000 | 0.326 | 0.623 | 0.050 | 1.250 |
| 20 | 0.010 | 0.000 | 1.000 | 0.320 | 0.630 | 0.050 | 1.250 |
| 21 | 0.025 | 0.000 | 1.000 | 0.345 | 0.579 | 0.075 | 1.250 |
| 22 | 0.025 | 0.000 | 1.000 | 0.320 | 0.630 | 0.050 | 1.000 |
| 23 | 0.025 | 0.000 | 1.000 | 0.340 | 0.610 | 0.050 | 1.250 |
| 24 | 0.025 | 0.000 | 1.200 | 0.320 | 0.630 | 0.050 | 1.250 |
| 25 | 0.025 | 0.000 | 1.000 | 0.317 | 0.658 | 0.025 | 1.250 |
| 26 | 0.025 | 0.000 | 1.000 | 0.338 | 0.595 | 0.067 | 1.250 |
| 27 | 0.025 | 0.000 | 1.000 | 0.342 | 0.595 | 0.064 | 1.250 |
| 28 | 0.025 | 0.000 | 1.000 | 0.320 | 0.580 | 0.100 | 1.250 |
| 29 | 0.025 | 0.000 | 1.000 | 0.334 | 0.616 | 0.050 | 1.250 |
| 30 | 0.025 | 0.000 | 1.000 | 0.344 | 0.632 | 0.025 | 1.250 |
| 31 | 0.025 | 0.000 | 1.000 | 0.320 | 0.630 | 0.050 | 1.250 |
| 32 | 0.025 | 0.000 | 1.100 | 0.320 | 0.630 | 0.050 | 1.250 |
| 33 | 0.025 | 0.000 | 1.000 | 0.320 | 0.630 | 0.050 | 1.500 |
| 34 | 0.025 | 0.000 | 1.000 | 0.320 | 0.650 | 0.030 | 1.250 |
| 35 | 0.025 | 0.000 | 1.000 | 0.317 | 0.633 | 0.050 | 1.250 |
| 36 | 0.025 | 0.000 | 1.000 | 0.325 | 0.600 | 0.075 | 1.000 |
| 37 | 0.025 | 0.000 | 1.000 | 0.333 | 0.597 | 0.070 | 1.250 |
| 38 | 0.025 | 0.000 | 1.000 | 0.320 | 0.605 | 0.075 | 1.250 |
| 39 | 0.005 | 0.000 | 1.000 | 0.317 | 0.610 | 0.073 | 1.250 |
| 40 | 0.005 | 0.000 | 1.000 | 0.317 | 0.610 | 0.073 | 1.250 |
| 41 | 0.025 | 0.000 | 1.000 | 0.323 | 0.600 | 0.077 | 1.250 |
| 42 | 0.025 | 0.000 | 1.000 | 0.325 | 0.600 | 0.075 | 1.250 |
| 43 | 0.025 | 0.000 | 1.025 | 0.317 | 0.633 | 0.050 | 1.250 |
| 44 | 0.025 | 0.150 | 1.025 | 0.317 | 0.633 | 0.050 | 1.250 |
| 45 | 0.025 | 0.190 | 1.025 | 0.317 | 0.633 | 0.050 | 1.250 |
| 46 | 0.025 | 0.200 | 1.025 | 0.317 | 0.633 | 0.050 | 1.250 |
| 47 | 0.025 | 0.225 | 1.025 | 0.317 | 0.633 | 0.050 | 1.250 |
| 48 | 0.025 | 0.250 | 1.025 | 0.317 | 0.633 | 0.050 | 1.250 |
| 49 | 0.025 | 0.300 | 1.025 | 0.317 | 0.633 | 0.050 | 1.250 |
| 50 | 0.025 | 0.400 | 1.025 | 0.317 | 0.633 | 0.050 | 1.250 |
| 51 | 0.025 | 0.500 | 1.025 | 0.317 | 0.633 | 0.050 | 1.250 |
| 52 | 0.000 | 0.000 | 1.000 | 0.320 | 0.630 | 0.050 | 1.250 |
| 53 | 0.125 | 0.000 | 1.000 | 0.320 | 0.630 | 0.050 | 1.250 |
| 54 | 0.025 | 0.000 | 1.000 | 0.320 | 0.630 | 0.050 | 0.800 |
| 55 | 0.100 | 0.000 | 1.000 | 0.320 | 0.630 | 0.050 | 0.800 |
| 56 | 0.025 | 0.000 | 0.950 | 0.320 | 0.630 | 0.050 | 1.250 |
| 57 | 0.025 | 0.000 | 1.400 | 0.320 | 0.630 | 0.050 | 1.250 |
| 58 | 0.025 | 0.000 | 1.000 | 0.234 | 0.666 | 0.101 | 1.250 |
| 59 | 0.025 | 0.000 | 1.000 | 0.250 | 0.600 | 0.150 | 1.250 |
| 60 | 0.025 | 0.000 | 1.000 | 0.267 | 0.633 | 0.099 | 1.250 |
| 61 | 0.025 | 0.000 | 1.000 | 0.283 | 0.667 | 0.050 | 1.250 |
| 62 | 0.025 | 0.000 | 1.000 | 0.283 | 0.642 | 0.075 | 1.250 |
| 63 | 0.025 | 0.000 | 1.000 | 0.284 | 0.617 | 0.150 | 1.250 |
| 64 | 0.025 | 0.000 | 1.000 | 0.290 | 0.660 | 0.050 | 1.250 |
| 65 | 0.025 | 0.000 | 1.000 | 0.299 | 0.650 | 0.050 | 1.250 |
| 66 | 0.025 | 0.000 | 1.000 | 0.299 | 0.600 | 0.101 | 1.250 |
| 67 | 0.025 | 0.000 | 1.000 | 0.320 | 0.680 | 0.000 | 1.250 |
| 68 | 0.025 | 0.000 | 1.000 | 0.320 | 0.530 | 0.150 | 1.250 |
| 69 | 0.025 | 0.000 | 1.000 | 0.332 | 0.639 | 0.000 | 1.250 |
| 70 | 0.025 | 0.000 | 1.000 | 0.360 | 0.590 | 0.050 | 1.250 |
| 71 | 0.025 | 0.000 | 1.000 | 0.374 | 0.600 | 0.025 | 1.250 |
| 72 | 0.025 | 0.000 | 1.000 | 0.374 | 0.600 | 0.025 | 1.250 |
| 73 | 0.025 | 0.600 | 1.025 | 0.317 | 0.633 | 0.050 | 1.250 |

TABLE 2

| Sample No. | Characteristics | | | |
|---|---|---|---|---|
| | Water absorption coefficient [%] | Dielectric constant | Qf [GHz] | $\tau_f$ [ppm/K] |
| 1 | <0.1 | 26.4 | 10879 | 22 |
| 2 | <0.1 | 27.0 | 10993 | 25 |

TABLE 2-continued

| Sample No. | Water absorption coefficient [%] | Dielectric constant | Qf [GHz] | $\tau_f$ [ppm/K] |
|---|---|---|---|---|
| 3 | <0.1 | 27.9 | 11927 | 24 |
| 4 | <0.1 | 31.7 | 12318 | 20 |
| 5 | <0.1 | 28.0 | 12841 | 24 |
| 6 | <0.1 | 28.6 | 13055 | 23 |
| 7 | <0.1 | 26.9 | 13099 | 19 |
| 8 | <0.1 | 32.1 | 14206 | 24 |
| 9 | <0.1 | 28.5 | 14271 | 24 |
| 10 | <0.1 | 31.5 | 15049 | 23 |
| 11 | <0.1 | 27.1 | 15217 | 22 |
| 12 | <0.1 | 27.3 | 15224 | 18 |
| 13 | <0.1 | 30.7 | 15381 | 20 |
| 14 | <0.1 | 30.7 | 15723 | 22 |
| 15 | <0.1 | 28.2 | 16201 | 20 |
| 16 | <0.1 | 28.3 | 16222 | 21 |
| 17 | <0.1 | 30.8 | 16247 | 18 |
| 18 | <0.1 | 28.7 | 17216 | 24 |
| 19 | <0.1 | 30.3 | 17224 | 21 |
| 20 | <0.1 | 29.1 | 17320 | 18 |
| 21 | <0.1 | 27.9 | 18273 | 25 |
| 22 | <0.1 | 30.2 | 18902 | 23 |
| 23 | <0.1 | 28.0 | 18903 | 21 |
| 24 | <0.1 | 30.5 | 18957 | 19 |
| 25 | <0.1 | 32.8 | 19242 | 24 |
| 26 | <0.1 | 28.3 | 19746 | 23 |
| 27 | <0.1 | 27.8 | 19900 | 20 |
| 28 | <0.1 | 29.3 | 20723 | 21 |
| 29 | <0.1 | 29.2 | 21010 | 18 |
| 30 | <0.1 | 28.1 | 21132 | 16 |
| 31 | <0.1 | 31.3 | 21895 | 20 |
| 32 | <0.1 | 31.0 | 22006 | 21 |
| 33 | <0.1 | 30.9 | 22015 | 23 |
| 34 | <0.1 | 30.2 | 22017 | 21 |
| 35 | <0.1 | 31.5 | 22169 | 26 |
| 36 | <0.1 | 26.7 | 22345 | 23 |
| 37 | <0.1 | 28.8 | 23017 | 21 |
| 38 | <0.1 | 29.8 | 23519 | 23 |
| 39 | <0.1 | 28.7 | 24373 | 16 |
| 40 | <0.1 | 28.6 | 24830 | 15 |
| 41 | <0.1 | 28.5 | 24943 | 22 |
| 42 | <0.1 | 27.0 | 26824 | 22 |
| 43 | <0.1 | 29.6 | 27031 | 17 |
| 44 | <0.1 | 27.4 | 24048 | 6 |
| 45 | <0.1 | 27.2 | 24143 | 3 |
| 46 | <0.1 | 27.0 | 23351 | 3 |
| 47 | <0.1 | 26.7 | 21717 | 1 |
| 48 | <0.1 | 26.9 | 16300 | 4 |
| 49 | <0.1 | 25.7 | 15232 | −3 |
| 50 | <0.1 | 25.1 | 12403 | −8 |
| 51 | <0.1 | 24.4 | 10082 | −12 |
| 52 | >0.1 | — | — | — |
| 53 | <0.1 | 26.0 | 5279 | 25 |
| 54 | >0.1 | — | — | — |
| 55 | >0.1 | — | — | — |
| 56 | <0.1 | Very small resonance | Very small resonance | — |
| 57 | >0.1 | — | — | — |
| 58 | <0.1 | Very small resonance | Very small resonance | — |
| 59 | <0.1 | Very small resonance | Very small resonance | — |
| 60 | <0.1 | Very small resonance | Very small resonance | — |
| 61 | <0.1 | Very small resonance | Very small resonance | — |
| 62 | <0.1 | Very small resonance | Very small resonance | — |
| 63 | <0.1 | Very small resonance | Very small resonance | — |
| 64 | <0.1 | Very small resonance | Very small resonance | — |
| 65 | <0.1 | 32.1 | 5972 | 23 |
| 66 | <0.1 | 29.3 | 7021 | 26 |
| 67 | <0.1 | 31.2 | 7895 | 23 |
| 68 | <0.1 | 28.3 | 3689 | 25 |
| 69 | <0.1 | 28.9 | 9722 | 25 |
| 70 | >0.1 | — | — | — |
| 71 | >0.1 | — | — | — |
| 72 | >0.1 | — | — | — |
| 73 | <0.1 | 23.9 | 6051 | −20 |

It can be seen from the results set out in Table 2 that for the dielectric compositions of the present invention, the dielectric constant $\epsilon$ is about 30, the value of Qf is advantageously high and the temperature coefficient $\tau f$ of the resonance frequency has a small value in the range of ±25 ppm/K. No data, except for the water absorption coefficient, are shown for samples numbers 52, 54, 55, 57 and 70 to 72; no data measurements were taken for these samples because of a sintering defect.

The dielectric materials of the present invention have a high Q-values and are able to be used for high frequency purposes but include no expensive Ta. Further, the materials have dielectric constants of about 30 and have reduced absolute values of the temperature coefficient $\tau_f$ of the resonance frequency. Moreover, dielectric materials having such excellent high frequency characteristics can be obtained without using special powder processes or sintering methods.

This application is based on Japanese Patent Application No. 2001-187008, filed Jun. 20, 2001, which is incorporated herein by reference in its entirety.

While the invention has been described in detail and with reference to the specific embodiments thereof, it will be apparent to one skilled in the art that various changes and modifications can be made therein without departing from the spirit and scope thereof.

What is claimed:

1. A dielectric material having a composite perovskite crystal structure including K, Ba, Mg and Nb as metallic elements in a main crystal phase and having a compositional formula represented by

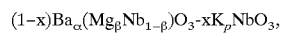
$(1-x)Ba_\alpha(Mg_\beta Nb_{1-\beta})O_3 - xK_p NbO_3,$ wherein x, α, β and p have values satisfying the conditions $0 < x \leq 0.1,\ 0.9 \leq \alpha \leq 1.3,\ 0.3 \leq \beta \leq 0.35\ \text{and}\ 1 \leq p \leq 2.$ 2. A dielectric material having a composite perovskite crystal structure including K, Mg, Sb, Ba and Nb as metallic elements in a main crystal phase and having a compositional formula represented by

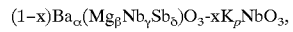
$(1-x)Ba_\alpha(Mg_\beta Nb_\gamma Sb_\delta)O_3 - xK_p NbO_3,$ wherein x, α, β, γ, δ and p have values satisfying the conditions $0 < x \leq 0.1,\ 0.9 \leq \alpha \leq 1.3,\ 0.3 \leq \beta \leq 0.35,\ 0 < \delta \leq 0.125,\ \beta+\gamma+\delta=1\ \text{and}\ 1 \leq p \leq 2.$ 3. A dielectric material having a composite perovskite crystal structure including Sn, K, Mg, Sb, Ba and Nb as metallic elements in a main crystal phase and having a compositional formula represented by

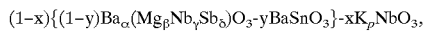
$(1-x)\{(1-y)Ba_\alpha(Mg_\beta Nb_\gamma Sb_\delta)O_3 - yBaSnO_3\} - xK_p NbO_3$, wherein x, y, α, β, γ, δ and p have values satisfying the conditions $0 < x \leq 0.1$, $0 < y \leq 0.5$, $0.9 \leq \alpha \leq 1.3$, $0.3 \leq \beta \leq 0.35$, $0 < \delta \leq 0.125$, $\beta + \gamma + \delta = 1$ and $1 \leq p \leq 2$.

4. A dielectric material as claimed in claim 1 wherein $1.0 \leq \alpha \leq 1.3$.

5. A dielectric material as claimed in claim 4 wherein $1.0 \leq \alpha \leq 1.2$.

6. A dielectric material as claimed in claim 5 wherein $1.0 \leq \alpha \leq 1.05$.

7. A dielectric material as claimed in claim 2 wherein $1.0 \leq \alpha \leq 1.3$.

8. A dielectric material as claimed in claim 7 wherein $1.0 \leq \alpha \leq 1.2$.

9. A dielectric material as claimed in claim 8 wherein $1.0 \leq \alpha \leq 1.05$.

10. A dielectric material as claimed in claim 3 wherein $1.0 \leq \alpha \leq 1.3$.

11. A dielectric material as claimed in claim 10 wherein $1.0 \leq \alpha \leq 1.2$.

12. A dielectric material as claimed in claim 11 wherein $1.0 \leq \alpha \leq 1.05$.

* * * * *